(12) United States Patent
Colt

(10) Patent No.: US 12,535,045 B2
(45) Date of Patent: Jan. 27, 2026

(54) APPARATUS AND METHOD FOR GENERATING ELECTRICITY FROM THE NATURAL FLOW OF A GAS WELL

(71) Applicant: 2T-Energy LLC, Houston, TX (US)

(72) Inventor: Walker Colt, Houston, TX (US)

( * ) Notice: Subject to any disclaimer, the term of this patent is extended or adjusted under 35 U.S.C. 154(b) by 0 days.

(21) Appl. No.: 19/014,866

(22) Filed: Jan. 9, 2025

(65) Prior Publication Data

US 2025/0230788 A1 Jul. 17, 2025

Related U.S. Application Data

(60) Provisional application No. 63/620,133, filed on Jan. 11, 2024.

(51) Int. Cl.

| | | |
|---|---|---|
| *F03B 13/02* | (2006.01) | |
| *F01D 15/08* | (2006.01) | |
| *F01D 15/10* | (2006.01) | |
| *H02K 7/11* | (2006.01) | |
| *H02K 7/18* | (2006.01) | |
| *H02K 49/10* | (2006.01) | |

(52) U.S. Cl.
CPC .............. *F03B 13/02* (2013.01); *F01D 15/08* (2013.01); *F01D 15/10* (2013.01); *H02K 7/11* (2013.01); *H02K 7/1823* (2013.01); *H02K 49/106* (2013.01); *F05B 2220/706* (2013.01)

(58) Field of Classification Search
CPC .......... F03B 13/02; F01D 15/08; F01D 15/10; H02K 7/11; H02K 7/1823; H02K 49/106; F05B 2220/706
See application file for complete search history.

(56) References Cited

U.S. PATENT DOCUMENTS

| | | |
|---|---|---|
| 2018/0320464 A1 | 11/2018 | Heitmann |
| 2023/0072544 A1* | 3/2023 | Church ..................... F03B 5/00 |
| 2023/0313784 A1 | 10/2023 | Alsubaity |

FOREIGN PATENT DOCUMENTS

| | | | |
|---|---|---|---|
| WO | WO-2023220286 A1 * | 11/2023 | ......... E21B 41/0085 |

\* cited by examiner

*Primary Examiner* — Joseph Ortega
(74) *Attorney, Agent, or Firm* — Werner IP Law, P.C.

(57) ABSTRACT

An energy harvesting system for use in a production line from a wellhead. The energy harvesting system captures the energy otherwise lost when reducing the pressure of production fluid from a wellhead to match that of a sales line. The system utilizes the flow of production fluid to drive a turbine and operate a powered unit (e.g., a generator). A magnetic coupling converts the rotary motion of the turbine shaft to rotary motion of the drive shaft of the powered unit.

13 Claims, 6 Drawing Sheets

APPARATUS AND METHOD FOR GENERATING ELECTRICITY FROM THE NATURAL FLOW OF A GAS WELL

CROSS REFERENCE TO RELATED APPLICATION

This application claims priority to U.S. Application No. 63/620,133 filed on Jan. 11, 2024, the disclosure of which is incorporated herein by reference for all purposes.

FIELD OF THE INVENTION

The present invention relates to the field of electrical power generation during hydrocarbon recovery operations. More specifically, the present invention relates to the production of electricity using fluids from a wellbore that is flowing naturally. The invention also relates to an apparatus for converting the fluid motion of natural gas from a well to electrical energy.

BACKGROUND OF THE INVENTION

In the normal course of operations a wellhead is connected to subsurface reservoirs using strings of casing and tubing. The reservoir fluids flow up the tubing strings to the wellhead under the drive of reservoir pressure. The flowing pressure at the wellhead is usually higher than the pipelines used to more production from the well to processing facilities. To control the well output pressure a choke is installed in-line and reduces the pressure to match that of the sales line. When the fluid flows through the choke a pressure drop occurs. This drop in pressure constitutes wasted energy. The present invention seeks to harvest this wasted energy.

SUMMARY OF THE INVENTION

In one aspect, the present invention relates to an energy harvesting system for capturing the energy otherwise lost when reducing the pressure of production fluid from a wellhead.

In another aspect, the present invention relates to an energy harvesting system for use in a production line from a wellhead, which utilizes the flow of production fluid to drive a turbine and ultimately a powered unit such as a generator. A magnetic coupling is used to convert the rotary motion of the turbine shaft to rotary motion of the drive shaft of the powered unit.

DETAILED DESCRIPTION OF PREFERRED EMBODIMENTS

Figure 1:
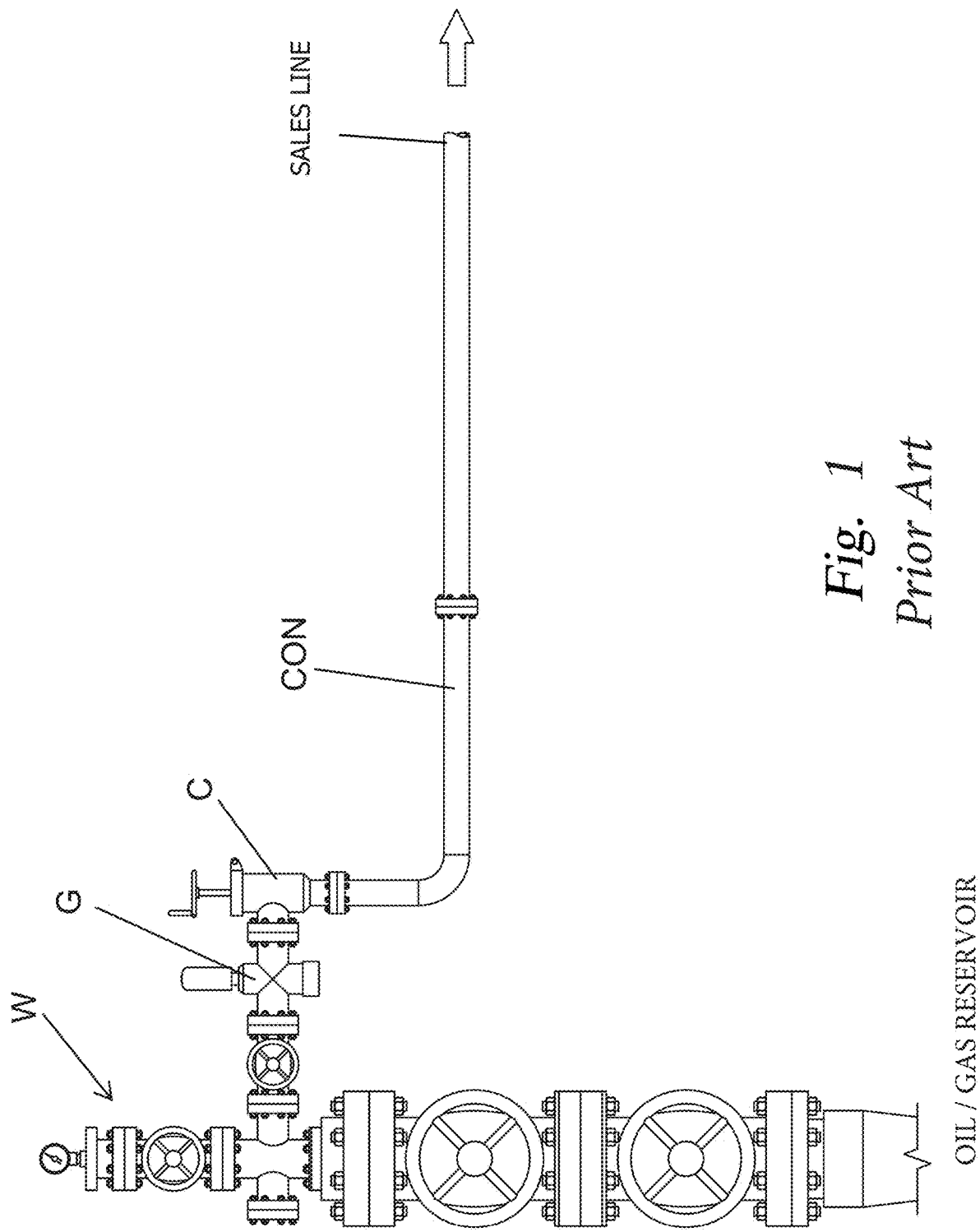
FIG. 1 depicts a prior art system of transferring production fluid from a wellhead to a sales line.

Embodiments of the invention are described more fully hereafter with reference to the accompanying drawings. Elements that are identified using the same or similar reference characters refer to the same or similar elements which perform the same functions across various embodiments. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

When introducing elements of various embodiments, the articles "a," "an," "the," "said," and the like, are intended to mean that there are one or more of the elements. The use of "top," "bottom," "above," "below," and variations thereof is made for convenience with respect to the orientation depicted in the drawings. Unless otherwise specified, the use of such terms does not require any particular orientation of the actual components. The term "fluid" encompasses liquids, gases, vapors, and combinations thereof. Unless otherwise specified, the term "connected" includes both direct and indirect connections.

Turning to FIG. 1, there shown a prior art wellhead system. Production fluid from the reservoir flows up and out through wellhead W, passes through gate valve G and choke C before flowing through conduit CON to the sales line. As discussed above, the fluid passing through choke C results in a drop in pressure and thus wasted energy.

Figure 2:
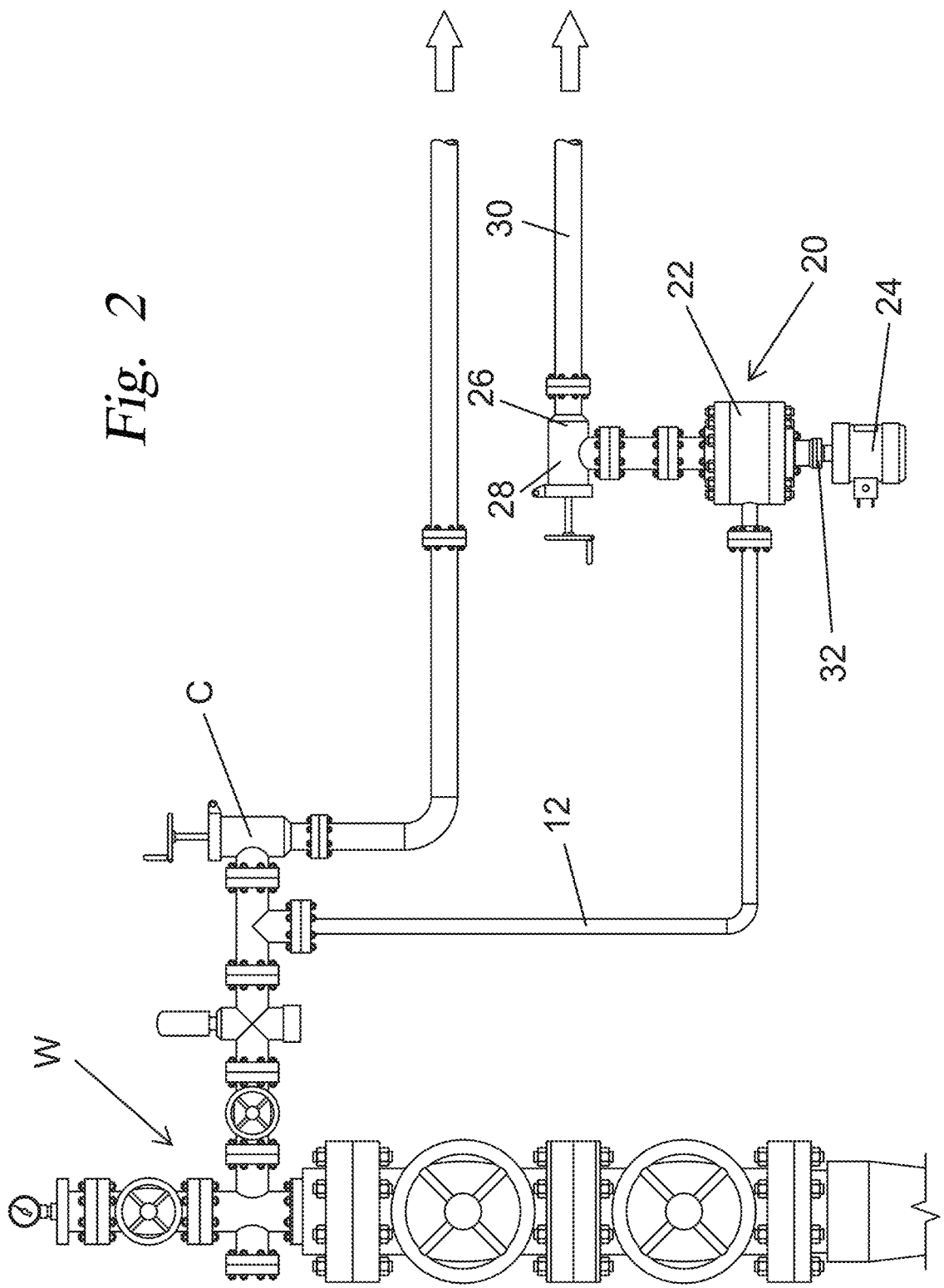
FIG. 2 is an elevational view of one embodiment of the energy harvesting system of the present invention.

Turning now to FIG. 2, there is shown a system 10 of the present invention. In order to harvest the energy that is otherwise wasted at the choke C, a bypass line 12 is positioned upstream of choke C. Bypass line 12 carries the fluid from the wellhead W to a turbine assembly 20. Turbine assembly 20 uses the production fluid motion to turn a rotary shaft within a turbine 22. As shown in the drawings, the turbine is a Tesla turbine, but it will be appreciated that other forms of turbines may be used. The rotary shaft 36 within turbine 22 is operatively connected to a drive shaft 62 of powered unit 24. Some non-limiting examples of powered units include a generator, an alternator, a pump, a compressor, etc. The description and drawings herein will focus on a generator as the powered unit 24, but the invention is not so limited. Additionally, it will be appreciated that the system can work without the bypass line. Rather, the turbine 22 and powered unit 24 will be installed directly into the main line upstream of a choke. The inclusion of a bypass line allows for the system to be added to existing systems.

The exhaust gas from turbine 22 is collected in the exhaust manifold 26, where a secondary choke 28 is installed. This second choke 28 reduces the exhaust gas pressure to match line pressure, allowing the gases to resume the journey along conduit 30 to the sales line.

Because the gases that make up the production fluid are highly flammable, it is necessary to ensure the gases stay inside the turbine assembly 20 without leakage. Thus, the connection between turbine 22 and powered unit 24 must be sealed against any leaks. This is accomplished by using a magnetic coupling 32.

Figure 3:
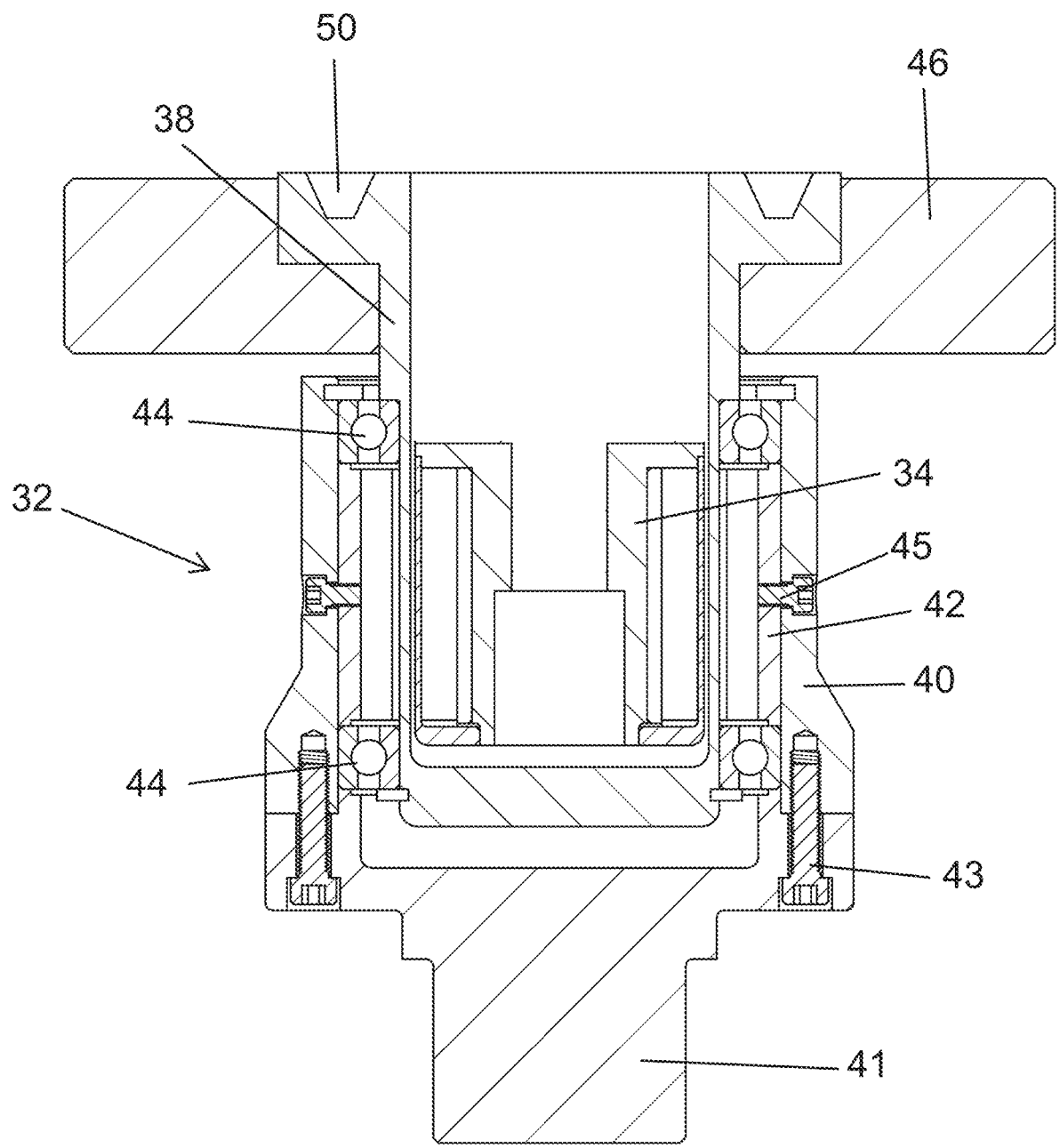
FIG. 3 is an elevational view in cross-section of one embodiment of the magnetic coupling of the present invention.

Turning to FIG. 3, there is shown one embodiment of magnetic coupling 32. Magnetic coupling 32 includes a set of high-power magnets 34 which can attach to a shaft 36 from the turbine 22 (see FIG. 4). Magnetic coupling 32 includes an inner hub 38 which houses magnets 34, and an outer hub which constitutes an external rotor 40 with pickup magnets 42 placed therein. Magnets 42 are shown held in place by bolts 45, but it will be appreciated that other means, well known to those skilled in the art may be used. The use of magnets eliminates the need for any openings through the wall of the inner hub to connect the rotor thereto and thus ensures there are no gas leaks. The end 41 of external rotor 40 is operatively connected to a drive shaft of powered unit 24. As shown in FIG. 3, the end 41 of rotor 40 is held in place by a series of bolts 43. It will be appreciated that rotor 40 could also be monolithically formed as a single piece.

Figure 4:
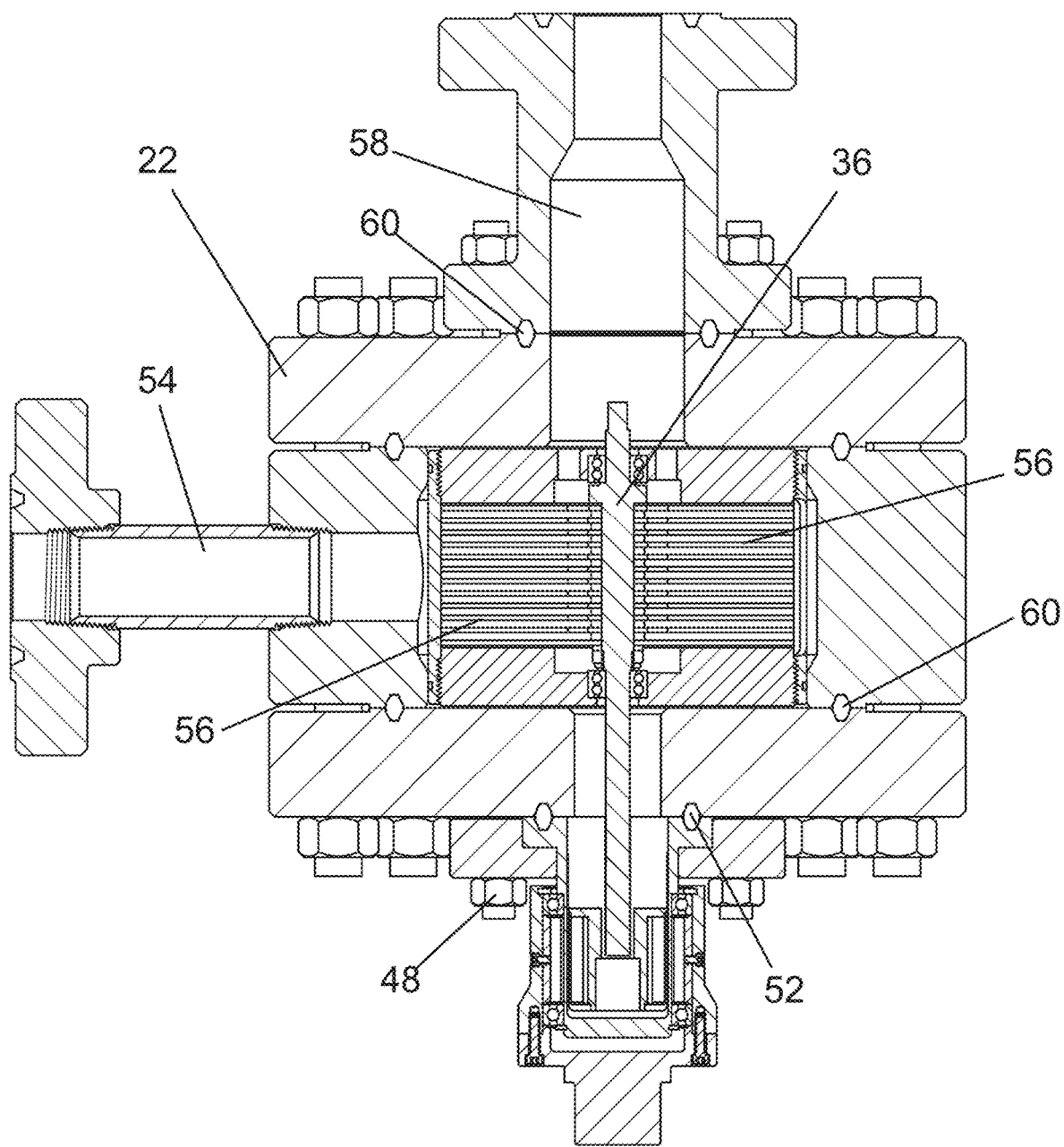
FIG. 4 is an elevational view in cross-section of one embodiment of the magnetic coupling of the present invention connected to a Tesla turbine.

Inner hub 38 of magnetic coupling 32 is affixed to turbine 22 with flange 46 and a series of bolts 48 (see FIG. 4). Inner hub 38 preferably includes recesses 50 for holding a ring gasket 52 to seal against any leaks. Inner hub 38 does not rotate. As the turbine shaft 36 rotates, the magnets 34 within hub 38 and affixed to shaft 36 rotate. The pull of the magnets cause magnets 42 to also rotate, in turn causing rotor 40 to rotate. Bearing assemblies 44 help ensure smooth rotation of rotor 40. The exact number and placement of bearing assemblies 44 can vary.

As seen in FIG. 3, there is no need for any threaded connections or the like to pass through the wall of inner hub 38. The attraction between magnets 34 and 42 keeps the rotor 40 in place. In a preferred embodiment, there are a plurality of magnets 34 circumferentially spaced within inner hub 38, and a corresponding number of magnets 42 correspondingly spaced in rotor 40. The exact number and spacing of the magnets 34/42 can vary depending on the needs of the user and the strength of the magnets. It is important though for there to be sufficient interaction between magnets 34 and magnets 42 to ensure the rotor 40 remains in position around inner hub 38, and to ensure the rotation of rotor 40 along with the rotation of turbine shaft 36.

Turning to FIG. 4, there is shown one embodiment of the magnetic coupling 32 affixed to turbine 22. Production fluid from wellhead W enters turbine 22 through inlet 54. The fluid flow causes the rotation of a series of parallel plates 56 and in turn the rotation of shaft 36 in the typical manner of a Tesla turbine. Shaft 36 extends into magnetic coupling 32 such that magnets 34 are in surrounding relationship thereto. Exhaust gases from turbine 22 exit through outlet 58. Ring gaskets 60 or similar sealing assemblies are used throughout turbine 22 to prevent leakage of any gases.

Figure 5:
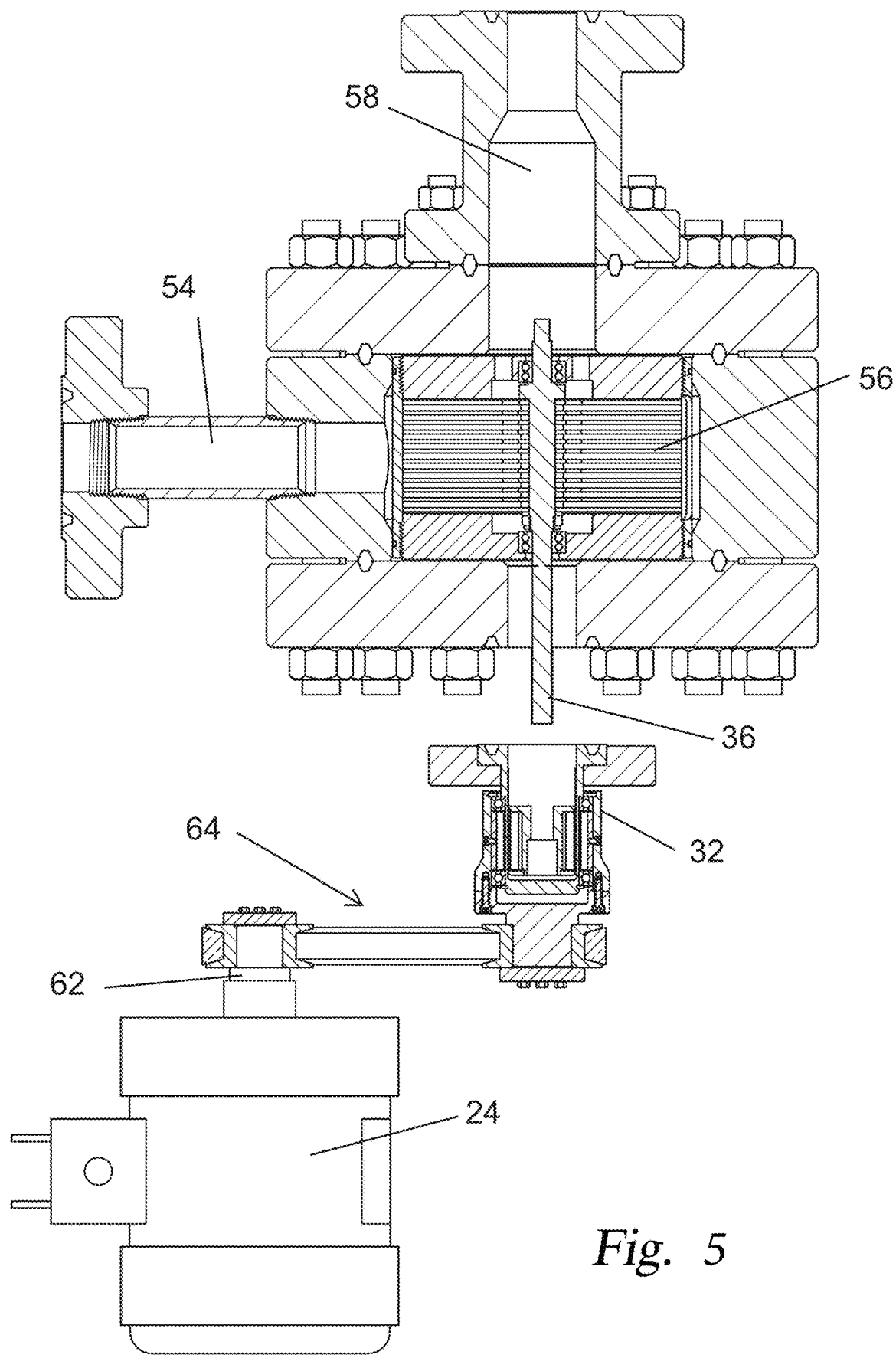
FIG. 5 is an elevational view, partly in section of one embodiment of the magnetic coupling of the present invention connected to a powered unit.

Turning to FIG. 5 there is shown one embodiment of the system of the present invention connected to a powered unit 24. In FIG. 5, rotor 40 is operatively connected to drive shaft 62 of powered unit 24 through a belt assembly 64 of the type well known to those skilled in the art. It will be appreciated that rotor 40 and drive shaft 62 can be directly or indirectly connected by a variety of means well known to those skilled in the art.

During operation, the speed of the turbine and its power output are controlled by the exhaust choke 28. This also controls the exhaust pressure to match the sales line pressure. An additional choke can be added upstream of the turbine to provide finer control of the turbine if desired. Rotary speed of the turbine is derived from the generator and a control loop can be added to adjust the rotary speed by varying the input choke. This is then balanced by adjusting the exhaust choke to maintain the exhaust pressure to within the parameters of the sales line.

Figure 6:
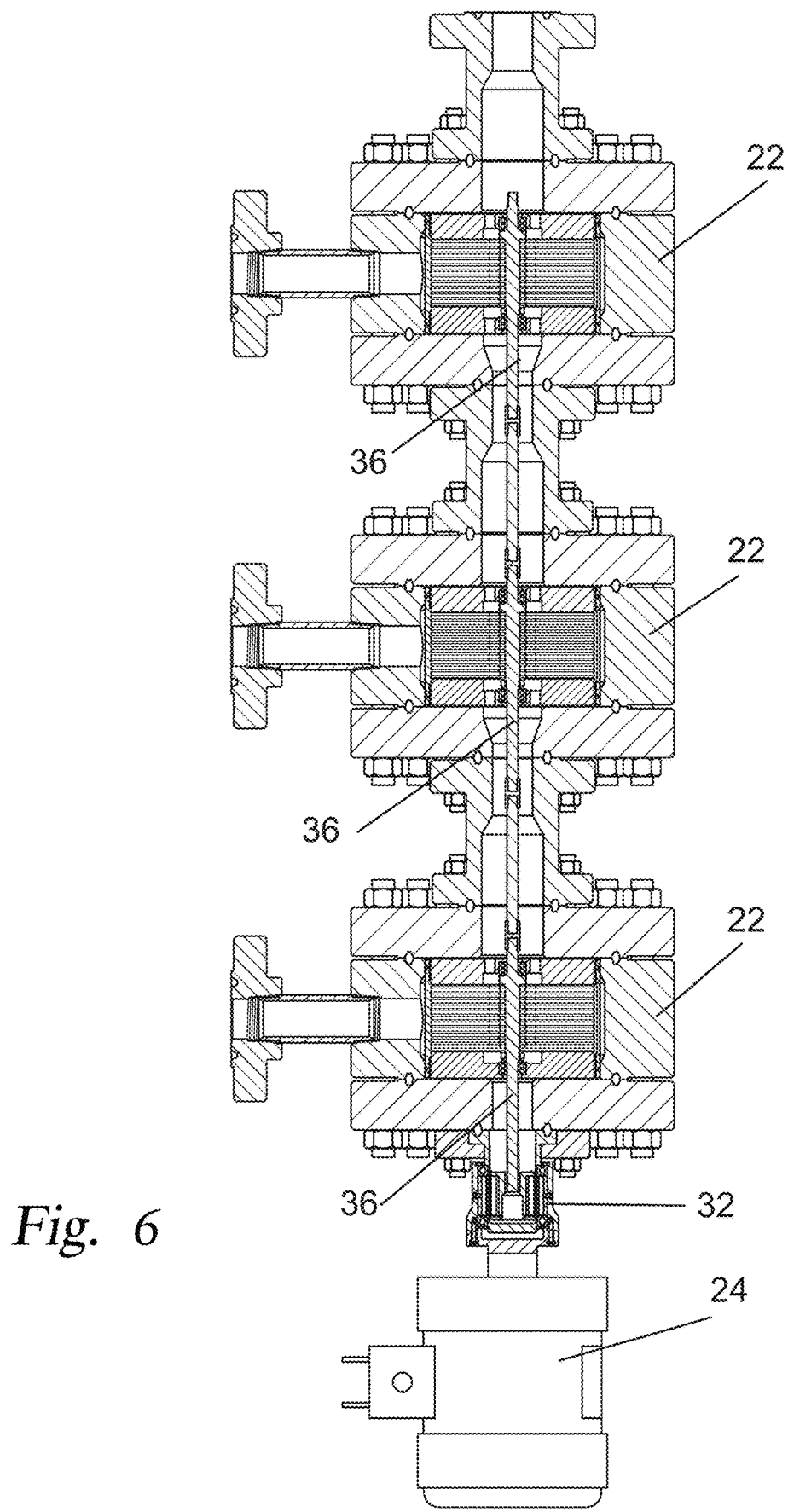
FIG. 6 is another embodiment of the present invention using a series of turbines connected in series.

Turning to FIG. 6, there is shown another embodiment of the invention in which a series of turbines 22 are used to drive a powered unit 24. The turbine is designed to be modular so in situations in which more energy needs to be harvested, additional turbines can be utilized. Additional turbines can be added and the inlets connected via a balanced manifold (not shown) in a manner well known to those skilled in the art to ensure matching input pressure and velocities. The shafts 36 of turbines 22 are connected together to a single magnetic coupling 32. The exhausts are also common, allowing for a single hookup. It will be appreciated that the exact number of turbines can vary.

The system of the present invention provides several advantages. The system harnesses the energy which is typically lost when lowering the pressure of the production fluid to safely enter the sales line. The energy can be used to drive any number of machines, e.g., a generator, alternator, pump, compressor, etc. The system uses a magnetic coupling which allows for the transfer of movement from the turbine shaft to the powered unit while ensuring the gases in the turbine do not leak out. The use of the magnetic coupling also allows for quick installation/replacement of the unit. The outer hub/rotor is held on the by the power of magnets.

Although specific embodiments of the invention have been described herein in some detail, this has been done solely for the purposes of explaining the various aspects of the invention and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

The invention claimed is:

1. In a system having a wellhead which generates production fluid from an oil/gas reservoir, a conduit for transferring production fluid to a sales line, and a choke for reducing pressure of the production fluid between the wellhead and the conduit, an improvement comprising an energy harvesting system is incorporated therein, said energy harvesting system comprising:
   a turbine having an inlet for receiving production fluid from said wellhead, a rotary shaft, and an exhaust outlet;
   a powered unit having a drive shaft;
   a magnetic coupling connected to said rotary shaft of said turbine and to said drive shaft of said powered unit, said magnetic coupling being operative to converting rotary motion of said rotary shaft into rotary motion of said drive shaft;
   wherein said magnetic coupling comprises a radially inner hub which houses one or more first magnets, and a radially outer rotor on which are connected one or more second magnets, said first magnets being in line with and radially inwards of respective ones of said second magnets, whereby rotation of said rotary shaft causes rotation of said first magnets which in turn causes rotation of said second magnets and of said rotor.

2. The system of claim 1, wherein said outer rotor is connected to said drive shaft of said powered unit.

3. The system of claim 2, wherein said outer rotor is connected to said drive shaft of said powered unit by a belt.

4. The system of claim 1, in which said turbine is a Tesla turbine.

5. The system of claim 1, wherein said powered unit comprises a generator, an alternator, a pump, or a compressor.

6. The system of claim 1 in which said exhaust outlet is connected to an exhaust manifold, there being an exhaust choke installed within said exhaust manifold, said exhaust manifold being in open communication with an exhaust conduit.

7. The system of claim 1, wherein there are a plurality of turbines, each turbine having an inlet in open communication with said bypass line, a rotary shaft, said rotary shafts plurality of turbines being connected in series such that only the terminal turbine is connected to said magnetic coupling.

8. The system of claim 1, further comprising:
a bypass line connected upstream of said choke and in open communication with said well, whereby said turbine is in open communication with said bypass line.

9. In a system having a wellhead which generates production fluid from an oil/gas reservoir, a conduit for transferring production fluid to a sales line, and a choke for reducing pressure of the production fluid between the wellhead and the conduit, an improvement comprising an energy harvesting system is incorporated therein, said energy harvesting system comprising:
a turbine having an inlet for receiving production fluid from said wellhead, a rotary shaft, and an exhaust outlet, the turbine being a Tesla turbine;
a powered unit having a drive shaft;
a magnetic coupling connected to said rotary shaft of said turbine and to said drive shaft of said powered unit, said magnetic coupling being operative to converting rotary motion of said rotary shaft into rotary motion of said drive shaft, wherein said magnetic coupling comprises an inner hub which houses one or more first magnets, and an outer rotor on which are connected one or more second magnets, whereby rotation of said rotary shaft causes rotation of said first magnets which in turn causes rotation of said second magnets and of said outer rotor, and
wherein said outer rotor is connected to said drive shaft of said powered unit by a belt.

10. The system of claim 9, wherein said powered unit comprises a generator, an alternator, a pump, or a compressor.

11. The system of claim 9 in which said exhaust outlet is connected to an exhaust manifold, there being an exhaust choke installed within said exhaust manifold, said exhaust manifold being in open communication with an exhaust conduit.

12. The system of claim 9, wherein there are a plurality of turbines, each turbine having an inlet in open communication with said bypass line, a rotary shaft, said rotary shafts plurality of turbines being connected in series such that only the terminal turbine is connected to said magnetic coupling.

13. The system of claim 9, further comprising:
a bypass line connected upstream of said choke and in open communication with said well said, whereby said turbine is in open communication with said bypass line.

* * * * *